Nov. 18, 1969 D. C. WELLER 3,479,598

SYSTEM FOR PHASE LOCKING TWO PULSE TRAINS

Filed April 17, 1967 4 Sheets-Sheet 1

INVENTOR
D. C. WELLER
BY J. P. Kearns
ATTORNEY

| A | B | C | $E_S$ | $\phi$ | T |
|---|---|---|---|---|---|
| 0 | 0 | 0 | | | INCREASE |
| 1 | 1 | 1 | | | INCREASE |
| 0 | 1 | 0 | DECREASE | | DECREASE |
| 0 | 0 | 1 | INCREASE | | DECREASE |
| 0 | 1 | 1 | | INCREASE | |
| 1 | 0 | 0 | | INCREASE | |
| 0 | 0 | 1 | | DECREASE | |
| 1 | 1 | 0 | | DECREASE | |

SYSTEM FOR PHASE LOCKING TWO PULSE TRAINS

Filed April 17, 1967

3,479,598
SYSTEM FOR PHASE LOCKING TWO PULSE TRAINS

David C. Weller, West Newbury, Mass., assignor to Bell Telephone Laboratories, Incorporated, Murray Hill, N.J., a corporation of New York Continuation-in-part of application Ser. No. 610,561, Jan. 20, 1967. This application Apr. 17, 1967, Ser. No. 631,521
Int. Cl. H04b *1/66*
U.S. Cl. 325—321 17 Claims

ABSTRACT OF THE DISCLOSURE

A system for optimizing the time and amplitude at which a first gated slicing circuit samples a received data signal includes two additional gated slicing circuits to provide "one" or "zero" output signals in accordance with the amplitude of the digital data signal at equal times leading and lagging the sampling time of the first gated slicing circuit. The output signals of the three gated slicing circuits are fed through logic gates to provide three control signals one of which phase shifts all three samples relative to the data signal, another of which adjusts the time interval between the first sample and the leading and lagging samples and the third adjusts the slice amplitude of the gated slicers. The first control signal is also fed back to a voltage controlled oscillator which generates a demodulating carrier used to demodulate a received carrier signal to provide the received data signal.

CROSS REFERENCE TO RELATED APPLICATION

This is a continuation-in-part of my copending application, Ser. No. 610,561, filed Jan. 20, 1967, now abandoned, and relates to a system for phase locking two pulse trains.

FIELD OF THE INVENTION

This invention relates to a system for recovering information from a synchronously transmitted data signal and particularly to a system for controlling the time at which a synchronously transmitted data signal is sampled and the amplitude at which slicing is performed.

BACKGROUND OF THE INVENTION

When a data signal is synchronuously transmitted, the information contained in the signal may be recovered by slicing the received data signal during a sampling instant once each symbol or bit interval. The timing of the sampling instant relative to the received data signal may be derived from the received data signal or from pilot tones transmitted with the data signal. The sampling instant is normally short compared with the bit interval and is centered as nearly as possible therein to minimize the chance of obtaining erroneous information due to noise or intersymbol interference.

DESCRIPTION OF THE PRIOR ART

One way to derive the sampling instant from the received data signal is to detect zero crossings in the received data signal and generate a sampling pulse train having a frequency equal to a long term average of the zero crossing repetition frequency. Systems such as this, while providing a train of sampling pulses which may be centered in the bit interval by a fixed delay, will not adapt to waveshape or phase changes in the received data signal so as to recenter the sampling pulse train in the bit interval. When the timing of a sampling instant is derived from one or more pilot tones, the proper sampling pulse repetition frequency is again derived but no provision is made for waveshape or phase changes in the received data signal.

In the transmission of television signals for example, pulses are transmitted with the television signals to synchronize the start of each line and frame at a television receiver. One system for deriving synchronizing pulses from the transmitted pulses at the television receiver is to generate a center pulse and two additional pulses respectively leading and lagging he center pulse by fixed equal times. The relative times of occurrence of the leading and lagging pulses are compared with the received pulse to provide a control signal which varies the time relationship of the derived synchronizing pulse with respect to the received pulse.

The system, while accurately centering a sampling pulse in a received pulse, is not readily adaptable to data systems. If the pulse widths of the received pulse is not known or if the pulse shape changes due to bandwidth limitation, the above-mentioned system would not be able to center the intermediate pulse in the received pulse because, if the received pulse were narrower than the time between the start of the leading pulse and the end of the lagging pulse, either the leading or lagging pulse would always be outside the received pulse. On the other hand, if the received pulse were wider than the spacing between leading and lagging pulses, the control signal would falsely indicate a centered pulse. Further, if the leading and lagging pulses were both outside of the received pulse, the above system could not adjust the timing at all.

It has been found that a data signal derived from demodulation of a received modulated carrier signal will exhibit nonsymmetry if a demodulating carrier signal employed is not properly phase related to the received modulated carrier signal. One system presently employed for automatic adjustment of the demodulating carrier phase employs slicing circuits for sampling the data signal at equal times leading and lagging a zero crossing of the data signal. This system compares the trailing edge of a first pulse in the data signal to the leading edge of the next pulse in the data signal. Pulse-to-pulse amplitude variations at the transmitter could cause the above-mentioned system to improperly adjust the phase of the demodulating carrier. This system further suffers from the disadvantage that circuitry is required to sense two successive pulses having the same polarity, i.e., ones or zeros, so that a proper comparison can be made.

SUMMARY OF THE INVENTION

The present invention contemplates a system in which a first train of sampling pulses having a variable phase relationship to a received train of data pulses is derived. Second and third trains of sampling pulses each delayed from the first train of sampling pulses are generated. Sampling circuitry is rendered effective by the three trains of sampling pulses to provide three output signals, each output signal representing the amplitude of the received train of data pulses at the respective sampling times. The states of the three output signals are compared to provide a first control signal for varying the phase relationship between the first sampling pulse and the received data pulses.

In one embodiment, the intervals of delay from the first to the second and third trains of sampling pulses, respectively, are each proportional to a second control signal. The states of the three output signals are further compared to provide the second control signal.

In a second embodiment, the train of data pulses is derived by demodulating a received modulated carrier signal with a demodulating carrier signal exhibiting a relative phase shift in response to the first control signal.

DESCRIPTION OF THE DRAWING

Other advantages of the invention will be apparent from the following detailed description and drawing wherein.

DETAILED DESCRIPTION

Figure 1:
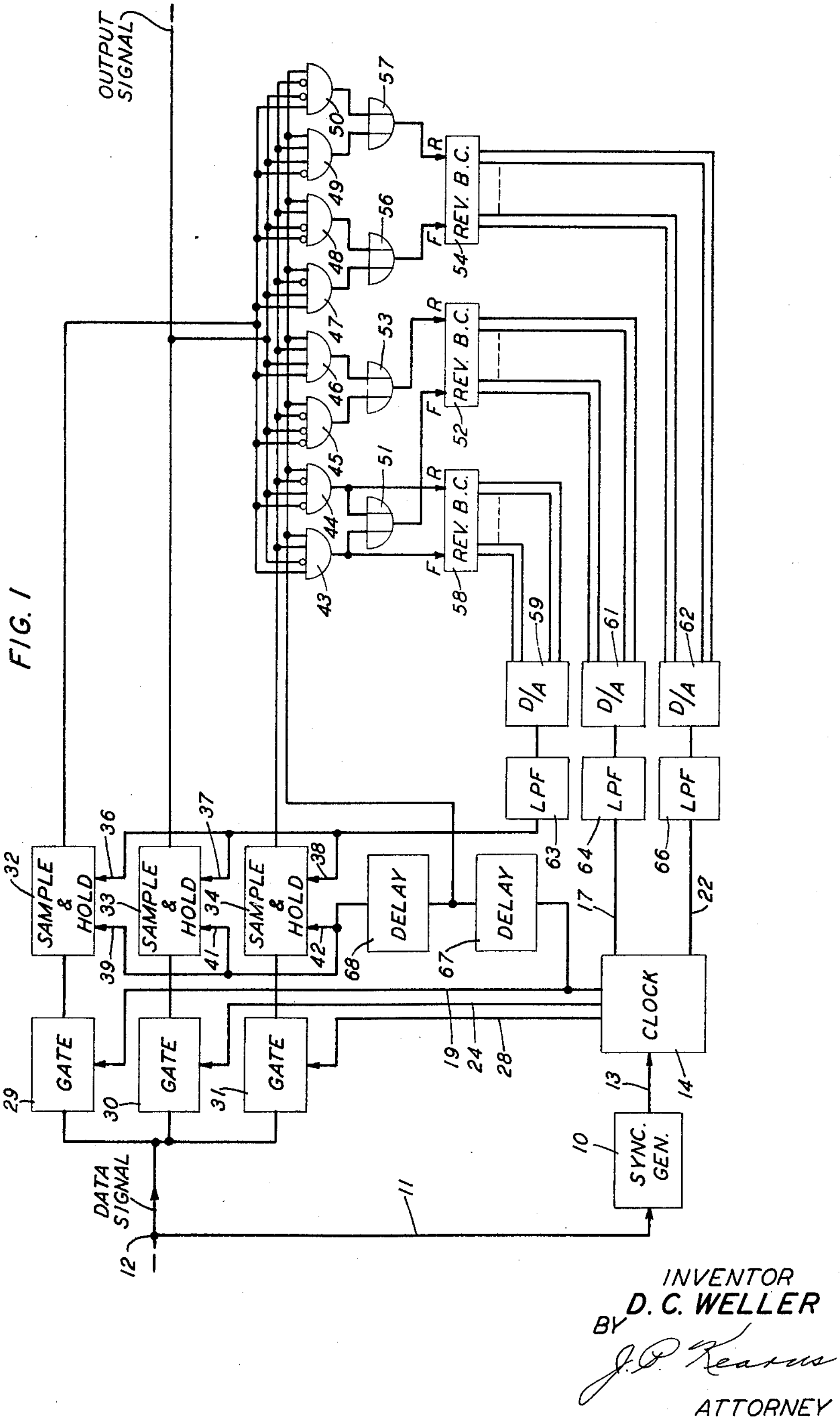
FIG. 1 shows in block diagram form a system employing the principles of this invention.

Referring now to FIG. 1, there is shown a system which includes a pulse generator embodying the principles of this invention. A received digital data signal, see line 12 in FIG. 4, having been transmitted through a bandwidth limited transmission medium, not shown, is applied to a sync generator 10 by a lead 11, through an input terminal 12. The sync generator 10 could be any well known system such as a phase-locked oscillator driving a pulse generator to provide a train of pulses, having a pulse repetition frequency equal to the bit repetition frequency of the received data signal. The output waveform of the sync generator 10 is designated as output 10 in FIG. 4. The sync generator 10 may alternatively drive the pulse train 10 from pilot tones which may be present in the received signal. The pulse train from the sync generator 10 is fed by a lead 13 to a sampling clock pulse generator 14, the details of which are shown in FIG. 2.

Figures 2, 3:
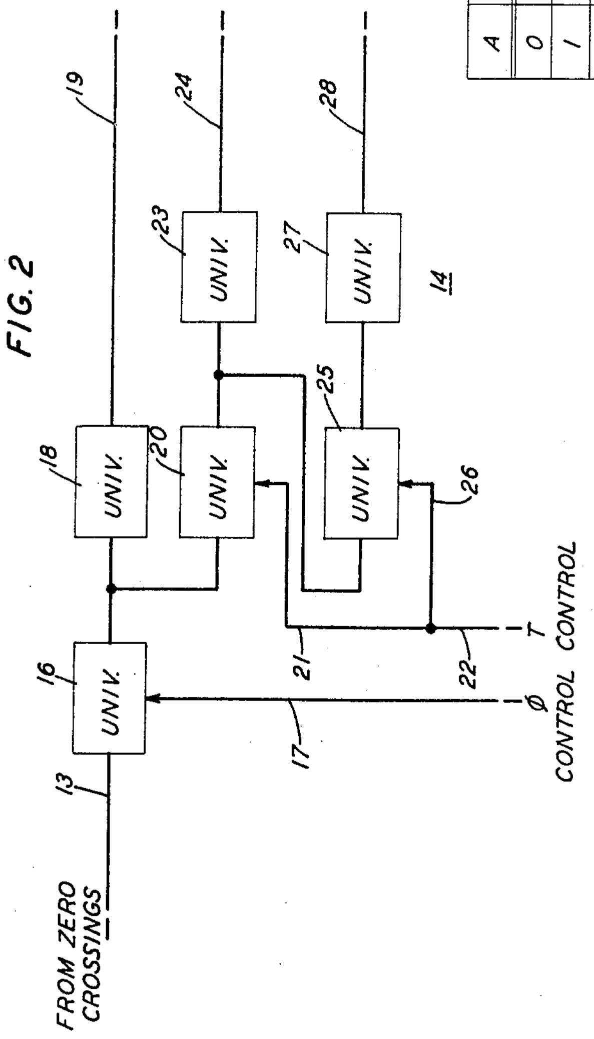
FIG. 2 shows a block diagram of a sampling pulse generator suitable for use in a system of this invention.
FIG. 3 is a truth table for the output signals of three slicers sampling a data signal.
Figure 4:
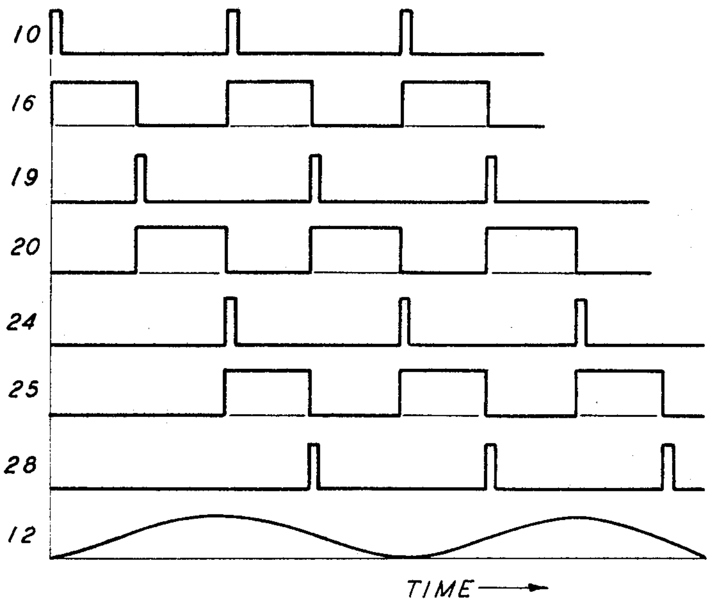
FIG. 4 shows a series of waveforms at various points in a system of this invention.

Referring now to FIG. 2, the pulse train from the sync generator 10 triggers a first voltage controlled univibrator 16 to provide a variable-width output pulse train designated 16 in FIG. 4. Each pulse of pulse train 16 has a duration dependent upon a voltage applied through a lead 17 to the univibrator 17. A voltage controlled univibrator may include a bistable multivibrator driving an integrator which controls a Schmitt trigger having a voltage controlled switching level. The output of the Schmitt trigger resets the bistable multivibrator and the integrator. The output, such as pulse train 16, shown in FIG. 4 would be taken off an output terminal of the bistable multivibrator.

The trailing edge of each pulse of pule train 16 triggers a first conventional univibrator 18 to provide a first sampling pulse train on an output lead 19 as shown in FIG. 4 and a second voltage controlled univibrator 20 to provide a second variable-width output pulse train designated 20 in FIG. 4. Each pulse of pulse train 20 has a duration dependent upon a voltage applied to the univibrator 20 through a lead 21 from a terminal 22. The trailing edge of each pulse of pulse train 20 triggers a second conventional univibrator 23 to provide a second sampling pulse train on a lead 24, as shown in FIG. 4, and a third voltage controlled univibrator 25 to provide a third variable pulsewidth pulse train designated 25 in FIG. 4. Each pulse of pulse train 25 has a duration dependent upon a voltage applied to univibrator 25 through a lead 26 also provided from the terminal 22. The trailing edge of each pulse of pulse train 25 triggers a third conventional univibrator 27 to provide a third sampling pulse train on a lead 28 as shown in FIG. 4. Therefore, it is seen that three sample pulse trains are provided on leads 19, 24, and 28 of sampling pulse generator 14, back phase shifted from the sync pulse train 10 by an amount dependent upon a voltage applied to the terminal 17. The timing between the individual sampling pulses of the respective pulse trains is controlled by a voltage applied to the terminal 22. Referring again to FIG. 4, it is seen that three sampling pulses, one from each of the pulse trains 19, 24, and 28 optimumly are spaced within one bit interval of the received data signal.

Referring again to FIG. 1, the three pulse trains on leads 19, 24, and 28 are applied to gates 29, 30, and 31. The gates 29, 30, and 31 sequentially pass portions of the received data signal to three sample and hold circuits 32, 33, and 34, respectively. Each sample and hold circuit 32, 33, or 34 may advantageously include a Schmitt trigger driving a bistable flip flop. The thresholds of the Schmitt triggers, such as $E_s$ in FIG. 5B, are each determined by signals applied from low-pass filter 63 to inputs 36, 37, and 38 of the sample and hold circuits 32, 33, and 34, respectively. It should be clear that various arrangements of gates and Schmitt triggers can be devised to sample a received data signal three times during a bit interval. The data signal samples can be stored in any one of a number of well known storage elements.

Figure 5A:
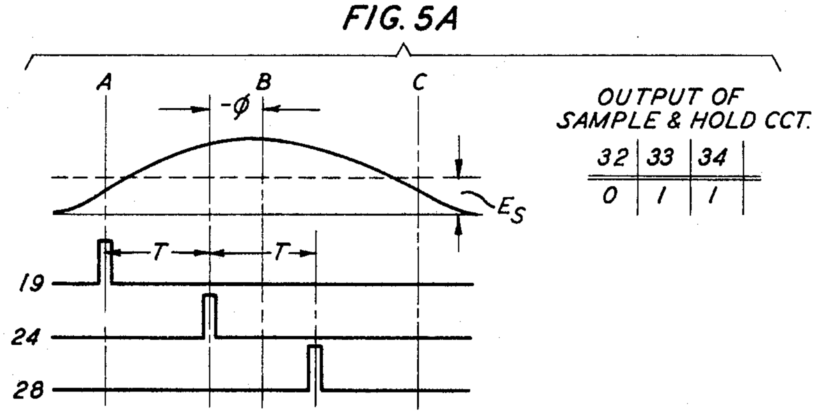
FIG. 5 shows examples of various sample pulse train timing and the slicer outputs resulting therefrom.
Figure 5B:
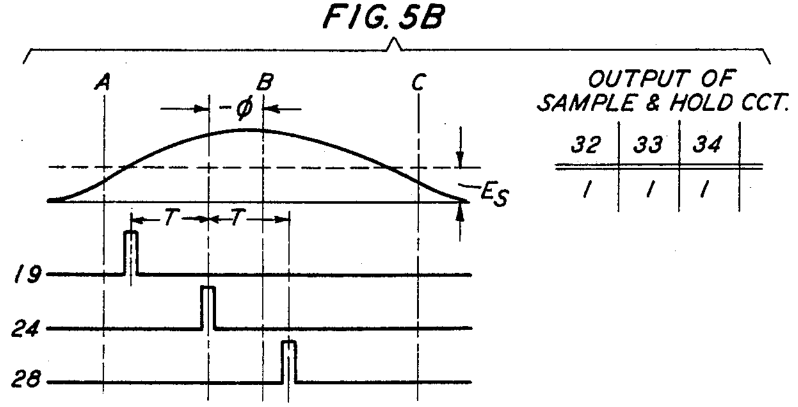
Figure 5C:
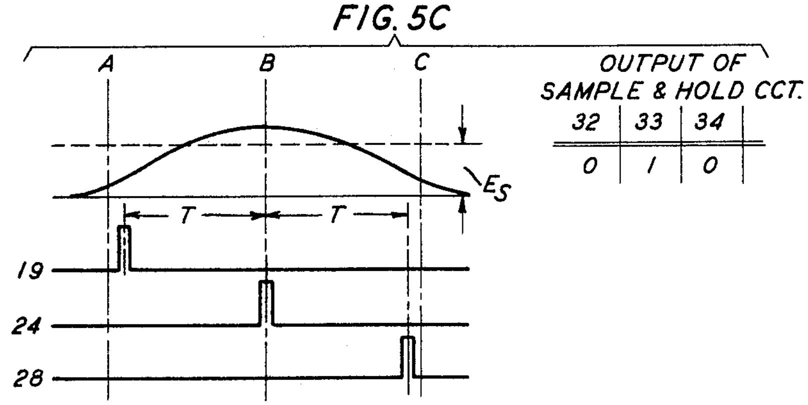

In FIGS. 5A, 5B, and 5C, there are shown three of the possible time relationships between pulses of the pulse trains 19, 24, and 28 and their relationships to the received data signal. In FIG. 5A, the slicing amplitude of the sample and hold circuits 32, 33, and 34, $E_s$ is properly adjusted. The times T between the pulse from the pulse train 19 and the pulse from pulse train 24, and between the pulse from the pulse train 24 to the pulse from pulse train 28, are properly set and equal. All three pulses from the pulse trains 19, 24, and 28 are phase shifted with respect to the received data pulse by an amount $-\varphi$ so that the outputs of the three sample and hold circuits 32, 33, and 34 may be represented by the code "011." Therefore, an output of "011" indicates a necessity to phase shift the three pulse trains 19, 24, and 28 to increase $\varphi$ to "0."

It is seen in FIG. 5B that with $E_s$ properly set, T too small, and $\varphi$ not zero, the outputs of the slicers 32, 33 and 34 are now represented by the code "111." Before $\varphi$ can be reduced to zero, T must be increased so that the pulses from the pulse trains 19 and 28 approach the leading and trailing edges of the received data pulses. Therefore, the output "111" indicates a necessity to increase T. FIG. 5C shows that with $\varphi$ equal to zero, T too large and $E_s$ too high, the outputs of the sample and hold circuits 32, 33, and 34 will indicate the code "010." It has been found that by adjusting both of these quantities in the indicated directions a properly centered sampling pulse from the pulse train 24 will result when the corrections are averaged over a number of bit intervals.

FIG. 3 is a logic table listing the eight possible combinations of outputs from the sample and hold circuits 32, 33, and 34 and the corrections indicated therefrom for $E_s$, T and $\varphi$. To accomplish these corrections the three output signals from the three sample and hold circuits 32, 33, and 34 are applied to eight AND gates 43 through 50, each output being applied to either an inverting or noninverting terminal of every gate to sense every possible combination of the three outputs. The output of the sample and hold circuit 32 is applied to a noninverting input of AND gates 43, 46, 47, and 50 to an inverting input of AND gates 44, 45, 48, and 49. The output of sample and hold circuit 33 is applied to an inverting input of AND gates 43, 45, 48, and 50. The output of sample and hold circuit 34 is applied to a noninverting input of AND gates 43, 46, 48, and 49 and to an inverting input of AND gates 44, 45, 47, and 50. The output from AND gates 43 and 44 are fed to OR gate 51 to advance a reversible binary counter 52 in response to an output from either AND gate 43 or 44. AND gates 45 and 46 are connected to OR gate 53 to reverse binary counter 52 in the event of any output from AND gates 45 and 46.

In like manner, AND gates 47 and 48 are connected to advance reversible binary counter 54 through OR gate 56 and AND gates 49 and 50 are connected to reverse counter 54 by OR gate 57. The outputs of AND gates 43 and 44 are connected to opposite inputs of a reversible binary counter 58. The outputs of each reversible binary counter 58, 52, and 54 are connected to digital-to-analog converters 59, 61, and 62, respectively, to convert the digital signal stored in the binary counter to an analog voltage level. The analog voltage levels are filtered in low pass filters 63, 64, and 66, to provide smoothed analog signals. The analog signals from low-pass filters 64 and 66 are connected by leads 17 and 22 to sampling clock pulse generator 14. The analog signal from low-pass filter 63 is applied to the level control inputs 36, 37, and 38 of the sample and hold circuits 32, 33, and 34.

Low-pass filters 63, 64, and 66 serve the further function of time averaging the control signals generated by reversible binary counters 58, 52, and 54 in response to the signals provided by the gating array. It is seen by referring to the truth table in FIG. 3, that for every possible combination of outputs from the sample and hold circuits 32, 33, and 34, a change is indicated in one or more of the factors $E_S$, $\varphi$, and T. No stable set of conditions exists except in a long term average of conditions. For example, if three sample and hold circuits 32, 33, and 34 indicate all "1's" or all "0's," T should be increased. On the other hand, if the center sample and hold circuits 33 occupies the opposite state from both the sample and hold circuits 32 and 34, it is indicated that T should be decreased. Therefore, by time averaging the control signal supplied by the reversible binary counters and digital-to-analog converters, the times between pulses in the sampling pulse trains on leads 19, 24, and 28 are adjusted so that the outputs from all three slicers 32, 33, and 34 will alternate on a statistical basis between "111" or "000" and "010" or "101."

When a received data signal is applied to the terminal 12, the pulses from the sampling pulse trains 19, 24, and 28 sequentially enable the gates 29, 30, and 31 to sequentially apply samples of the received data signal to sample and hold circuits 32, 33, and 34. In each bit interval, upon the application of a pulse train from the third sampling pulse train 28, an enabling pulse is supplied by a delay element 67 to enable gates 43 through 50 to provide appropriate feedback signals to control the sampling time and amplitude of sample and hold circuits 32, 33, and 34. The second delay element 68 resets the sample and hold circuits upon the application of the enabling pulse from element 67. While the embodiment of the invention disclosed operates to provide a sampling pulse to sample a binary signal, it is apparent that this invention is equally applicable to provide sampling pulses for multilevel signals. A separate pulse generator employing the principles of this invention may be used for each level or the multilevel signal may be folded to provided overlapping eyes and one system can be used to provide sampling pulses for the multilevel signal.

It should be apparent that the adjustment of T and $\varphi$ in the above-described embodiment presents a small degree of interaction. Since the adjustments are made systematically by a servo system, this interaction is not objectionable. If, for some reason, however, one desired to eliminate the interaction of T and $\varphi$, the signal on lead 22 could be inverted and applied to the control input of a univibrator similar to univibrator 20. The univibrator 20 would be inserted between the lead 13 and the univibrator 16. The signal on the lead 13 would drive the added univibrator, the output of which would drive the univibrator 16.

Figure 5D:
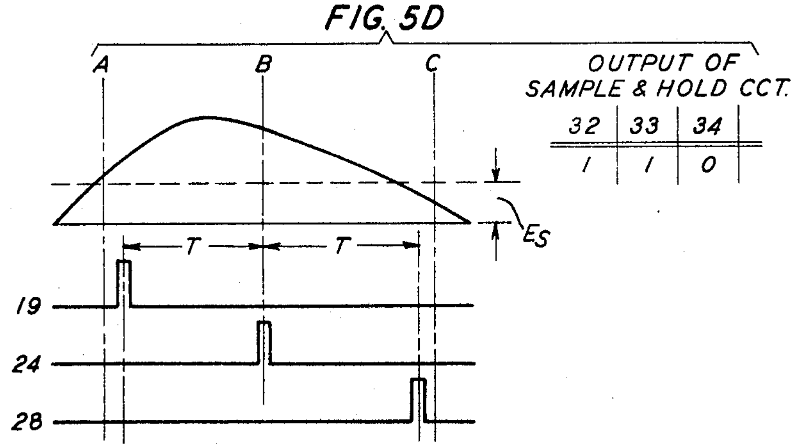
Figures 5E, 6:
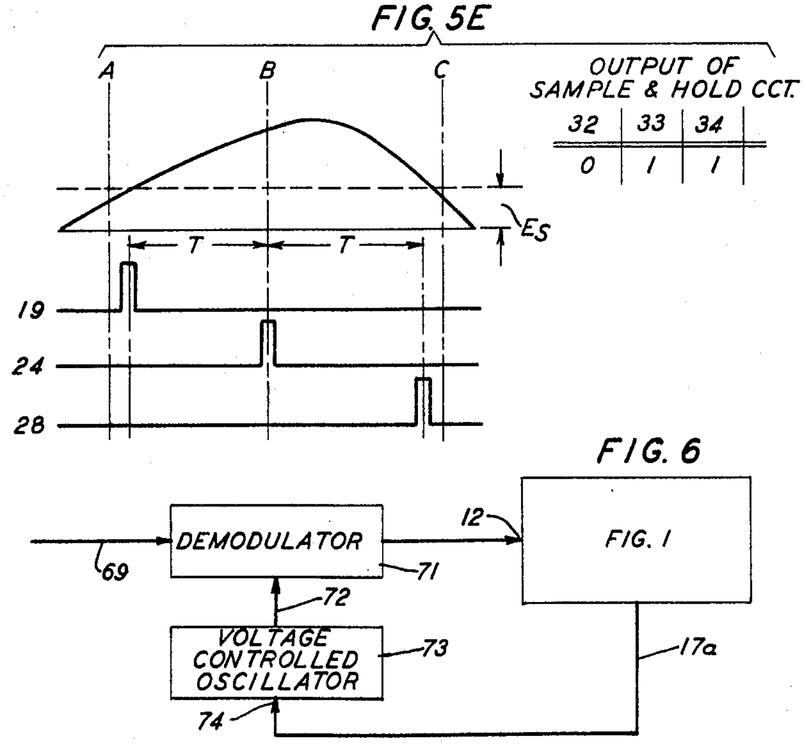
FIG. 6 shows in block diagram form a system for adjusting the demodulating carrier phase in a system employing the principles of the invention.

Referring now to FIG. 6, there is shown a system employing the principles of this invention in which a received carrier signal modulated by a digital data signal is applied to a lead 69. The digital data signal is recovered from the modulated signal by demodulating the received carrier signal in a demodulator 71. The received carrier signal may have been modulated by single sideband, vestigial sideband or other modulation techniques which produce signals requiring a separate source of carrier tone for demodulation. The digital data signal is applied to the input terminal 12 of the system shown in FIG. 1 by the demodulator 71. The demodulating carrier applied to demodulator 71 by a lead 72 is generated by a voltage controlled oscillator 73.

It has been found that if the relative phase of the demodulating carrier on the lead 72 is improper with respect to the modulated carrier signal on the lead 69, the received data signal applied to the lead 12 will exhibit distortion. FIG. 5D shows a received data signal having been demodulated by employing a demodulating carrier improperly phased. It is noted that with the pulse trains 19, 24, and 28 properly phased with respect to the received data signal and the slicing level $E_S$ at its proper height, the output from the three sample and hold circuits 32, 33, and 34 will be "110" rather than the "111" or "010" expected from a signal when the timing is properly phased. It is seen that this is due to nonsymmetry in the received data pulse. Similarly, FIG. 5E in which the received data pulse is nonsymmetrical but tilted to the right rather than to the left, the output of the three sample and hold circuits 32, 33, and 34 will be "011" rather than "111" or "010" as would be expected. Therefore, it is noted that any output of "011" or "110" might indicate a nonsymmetrical "1" data pulse instead of an error in $\varphi$. Similarly, outputs from the sample and hold circuits 32, 33, and 34 of "001" or "100" might indicate a nonsymmetrical "0" data pulse. Therefore, a signal which would phase shift the demodulating carrier on the lead 72 in one direction for the outputs of the sample and hold circuits 32, 33, and 34 of "011" or "100" and the opposite direction for the outputs of "001" or "110" could be employed to correct received data signal distortion due to demodulating carrier phase offset. It will be remembered that such a control signal is already present on the lead 17 in FIG. 1. Therefore, a lead 17*a* connected to the lead 17 in the system of FIG. 1 is applied to a control input 74 on the voltage controlled oscillator 73 to adjust the phase of the demodulating carrier signal on the lead 72. It has been found that a combination of adjustments, above described, will result in a symmetrical received digital data pulse being sampled at an appropriate level in the widest opening of the data eye.

It has also been found that when the modulated signal includes a pilot tone at the correct frequency and with a fixed phase relationship to the carrier originally used for modulation the phase of the local oscillator may be determined on a basis of a combination of the phase of the pilot and the control signal on lead 17. This arrangement can yield better performance when certain types of phase distortion are present.

It is to be understood that the above-described arrangement is simply illustrative of the application of the principles of this invention. Numerous other arrangements employing the principles of this invention will be readily apparent to those skilled in the art.

What is claimed is:

1. In combination:

means for deriving a first train of sampling pulses from a received data signal;

means responsive to a control signal for providing a second and a third train of sampling pulses delayed first and second intervals respectively from said first train of sampling pulses, each interval being proportional to said control signal;

means responsive to the instantaneous amplitude of said data signal and rendered effective by said first, second, and third trains of sampling pulses to provide first, second, and third output signals, respectively; and means responsive to the state of said first, second, and third output signals for generating said control signal.

2. A combination as defined in claim 1 wherein said means responsive to the state of said first, second, and third output signals includes:

means responsive to the concurrence of said first, second, and third output signals for increasing said control signal.

3. A combination as defined in claim 2 wherein said means responsive to the state of said first, second, and third output signals also include:

means responsive to a concurrence of said first and third signal and a nonconcurrence of said second signal therewith for decreasing said control signal; and averaging means responsive to said control signal increasing and decreasing means to provide said control signal.

4. A combination as defined in claim 1 wherein said means responsive to the state of said first, second, and third output signals includes:

means responsive to a concurrence of said first and third signals and a nonconcurrence of said second signal therewith for decreasing said control signal.

5. The combination as defined in claim 1 wherein:

said means for deriving said first train of sampling pulses is responsive to a second control signal for shifting said phase of said first train of sampling pulses relative to said received train of pulses; and means responsive to the state of said first, second and third output signals for varying said second control signal.

6. The combination as defined in claim 5 including:

means for generating a demodulating carrier signal exhibiting a relative phase shift in response to said second control signal;

means responsive to the phase relationship between a received modulated carrier signal and said demodulating carrier signal to provide said data signal.

7. In combination:

means for providing a first train of sampling pulses having a phase relationship to a data signal in accordance with a control signal;

means for providing a second and a third train of sampling pulses each delayed from said first train of sampling pulses;

means responsive to the instantaneous amplitude of said data signal and rendered effective by said first, second, and third train of sampling pulses to provide first, second, and third output signals, respectively; and means responsive to the state of said first, second, and third output signals for generating said control signal.

8. A combination as defined in claim 7 wherein said means responsive to the state of said first, second, and third output signals include:

means for varying said control signal when said second output signal is equal to either said first or third output signal but is not equal to said other of said first or third output signals.

9. The combination as defined in claim 8 including:

means for generating a demodulating carrier signal exhibiting a relative phase shift in response to said control signal;

means responsive to the phase relationship between a received modulated carrier signal and said demodulating carrier signal to provide said data signal.

10. In combination:

means for deriving a first train of sampling pulses from a data signal;

means for providing a second and a third train of sampling pulses each delayed from said first train of sampling pulses;

means responsive to the instantaneous amplitude of said data signal and rendered effective by said first, second, and third trains of sampling pulses respectively to provide first, second, and third output signals, respectively, each output signal changing from a first value to a second value when the instantaneous amplitude of said data signal exceeds a reference value, said reference value being dependent upon a first control signal; and means responsive to the state of said first, second, and third output signals for generating said first control signal.

11. A combination as defined in claim 10 wherein said means responsive to the state of said first, second, and third output signals include:

means responsive to said first, second, and third output signals exhibiting said second value for increasing said control signal; and means responsive to said first, second, and third output signals exhibiting said first value for decreasing said first control signal.

12. A combination as defined in claim 10 wherein:

said means for deriving said first train of sampling pulses is responsive to a second control signal for shifting said phase of said first train of sampling pulses relative to said received train of pulses; and means responsive to the state of said first, second, and third output signals for varying said second control signal.

13. A combination as defined in claim 12 wherein:

said means for providing said second and third train of sampling pulses is responsive to a third control signal for varying each of said delays from said first train of sampling pulses; and means responsive to the state of said first, second, and third output signals for varying said third control signal.

14. The combination as defined in claim 13 including:

means for generating a demodulating carrier signal exhibiting a relative phase shift in response to said second control signal;

means responsive to the phase relationship between a received modulated carrier signal and said demodulating carrier signal to provide said data signal.

15. The combination as defined in claim 12 including:

means for generating a demodulating carrier signal exhibiting a relative phase shift in response to said second control signal;

means responsive to the phase relationship between a received modulated carrier signal and said demodulating carrier signal to provide said data signal.

16. In combination:

means responsive to a first control signal, rendered effective by a synchronizing pulse for providing a first sampling pulse delayed from said synchronizing pulse an interval proportional to said first control signal;

means responsive to a second control signal rendered effective by said first sampling pulse for providing a second sampling pulse delayed from said first sampling pulse an interval proportional to said second control signal; and means responsive to said second control signal, rendered effective by said second sampling pulse for providing a third sampling pulse delayed from said second sampling pulse an interval proportional to said second control signal.

17. In combination:

means for generating a demodulating carrier signal exhibiting a relative phase shift in response to a control signal;

means responsive to the phase relationship between a received modulated carrier signal and said demodulating carrier signal to provide a data signal;

means for providing a first train of sampling pulses having a phase relationship to said data signal;

means for providing a second and a third train of sampling pulses each delayed from said first train of sampling pulses;

means responsive to the instantaneous amplitude of said data signal and rendered effective by said first, second, and third train of sampling pulses to provide first, second, and third output signals, respectively; and means responsive to the state of said first, second, and third output signals for generating said control signal.

References Cited

UNITED STATES PATENTS

| | | | |
|---|---|---|---|
| 3,112,364 | 11/1963 | Myles | 178—69.5 |
| 3,199,030 | 8/1965 | Oxford et al. | 325—329 |

ROBERT L. GRIFFIN, Primary Examiner

R. S. BELL, Assistant Examiner

U.S. Cl. X.R.

178—69.5; 325—329, 419; 329—104; 331—12